United States Patent [19]

Pauls et al.

[11] Patent Number: 5,814,674
[45] Date of Patent: *Sep. 29, 1998

[54] METHOD FOR PROCESSING RESIDUE-CONTAINING PACKAGES

[75] Inventors: Mathias Pauls; Torsten Kellner, both of Appenzell, Switzerland

[73] Assignee: Rathor AG, Appenzell, Switzerland

[ * ] Notice: The term of this patent shall not extend beyond the expiration date of Pat. No. 5,672,631.

[21] Appl. No.: 697,879

[22] Filed: Sep. 3, 1996

Related U.S. Application Data

[63] Continuation of Ser. No. 325,271, filed as PCT/EP93/00988 Apr. 23, 1993 published as WO92/19393 Nov. 12, 1992, abandoned.

[30] Foreign Application Priority Data

Apr. 23, 1992 [EP] European Pat. Off. .. PCT/EP92/00983
Feb. 4, 1993 [DE] Germany .......................... 43 03 168.4

[51] Int. Cl.$^6$ ................................ C08J 11/04; C08J 3/00; B01D 1/00
[52] U.S. Cl. .............................. 521/49; 521/40; 521/49.5; 524/235; 422/286; 422/292; 422/901
[58] Field of Search ................................ 521/49, 40, 49.5; 524/235; 422/286, 292, 901

[56] References Cited

U.S. PATENT DOCUMENTS

| | | | |
|---|---|---|---|
| 3,708,440 | 1/1973 | Frullo et al. ......................... | 521/49.5 |
| 3,734,776 | 5/1973 | Keogh, Jr. ............................ | 134/13 |
| 3,983,087 | 9/1976 | Tucker et al. ........................ | 521/49.5 |
| 4,014,809 | 3/1977 | Kondo et al. ......................... | 252/182 |
| 4,162,995 | 7/1979 | Sheratte ............................... | 521/49 |
| 4,267,078 | 5/1981 | Lidy et al. ............................ | 521/49 |
| 4,339,358 | 7/1982 | Schutz ................................. | 521/49 |
| 4,511,680 | 4/1985 | Niederdellmann ................... | 521/49 |
| 4,809,915 | 3/1989 | Koffsky et al. ....................... | 241/36 |
| 4,844,106 | 7/1989 | Hunter et al. ........................ | 134/73 |

FOREIGN PATENT DOCUMENTS

| | | | |
|---|---|---|---|
| A-208660 | 1/1987 | European Pat. Off. . | |
| A-359106 | 3/1990 | European Pat. Off. . | |
| A-422501 | 4/1991 | European Pat. Off. . | |
| 546415 | 6/1993 | European Pat. Off. ............ | 521/49 |
| U-8805008 | 7/1988 | Germany . | |
| A-3814312 | 11/1988 | Germany . | |
| A-3817273 | 1/1989 | Germany . | |
| 0023638 | 2/1982 | Japan .................................. | 521/49 |
| WO 91/18687 | 12/1991 | WIPO . | |

OTHER PUBLICATIONS

"FCKW aus PUR–Isolierschaum rückgewinnen," *Kuststoffe*, vol. 80, No. 4, p. 509 (Apr. 1990), Munich, Germany.

*Primary Examiner*—Vasu Jagannathan
*Assistant Examiner*—Olga Asinovsky
*Attorney, Agent, or Firm*—Hazel & Thomas

[57] ABSTRACT

A method is disclosed for processing residue-containing packages so as to receive valuable materials, in particular pressure containers for dispensing foams with propellant gases. For that purpose, extraction with a solvent is carried out essentially in atmosphere of propellant gas and/or solvent vapors.

21 Claims, 3 Drawing Sheets

METHOD FOR PROCESSING RESIDUE-CONTAINING PACKAGES

This application is a Continuation of application Ser. No. 08/325,271, filed as PCT/EP93/00988 Apr. 23, 1993 published as WO92/19393 Nov. 12, 1992 now aband. which is with U.S. application Ser. No. 08/137,187 filed Mar. 28, 1994 now abandoned.

This invention concerns a method for processing used or damaged, residue-containing packages and recovering the valuable materials, in particular from pressurized cans (aerosol cans) for dispensing polyurethane foam with propellant gases, by extracting them with a solvent, as well as a plant for using this method.

Residue-containing packages such as partially or completely emptied aerosol cans, which occur in great quantities, are an increasing problem for waste disposal. They cannot be dumped in waste disposal sites for environmental reasons because the residues still contained in the cans can escape to the atmosphere, the ground, or the ground water where they can cause considerable damage. The same applies to incineration which is frequently not complete, particularly for chemical-technical products, and which produces great quantities of harmful substances which can only be bonded, if at all, through very expensive measures. Insofar, incineration will greatly reduce the waste volume, but does not lead to a solution of the effects on the environment.

In the following, we will discuss this problem in detail by referring to the disposal of prepolymer-containing aerosol cans for producing the polyurethane foams.

The polyurethane foams have found a wide use in many areas. In the construction industry, in particular, they are used for sealing and insulating, but also in technical areas. As a rule, polyurethane foams are dispensed from aerosol cans containing a polyurethane prepolymer together with the necessary propellant and, if necessary, some additives. These aerosol cans are pressurized, cannot be reused and must therefore be disposed of. On the other hand, they represent a problem which cannot be solved through normal waste disposal. In addition, aerosol cans, particularly older ones, regularly contain fluoridated hydrocarbons, which are considered damaging to the ozone layer and should therefore not reach the atmosphere.

Within the framework of the efforts to contain residential and commercial waste, increasingly, measures are being discussed and regulations are being passed which force manufacturers to take back these products after use and take measures for their reuse or disposal. These measures have made it necessary to search for ways to treat such waste products in an economic way.

When processing these returned aerosol cans for polyurethane foams, a number of problems arise which, until now, have been an obstacle to economic recycling and recovery. Some of the returned cans, for example, are still under considerable pressure because of the remaining propellant gas, which causes problems when shredding them or incinerating them. Furthermore, these cans are at different levels of filling, ranging from outdated cans with practically full prepolymer contents, which cannot be dispensed because of a blocked valve, to the practically emptied cans with prepolymer residues sticking to the edges, either in interlaced or non-interlaced condition. Until now, these varied conditions stood in the way of a unified method for recovering the residues.

Until now, aerosol cans were processed in plants filled with traditional inert gases because of the assumed danger of explosion during the process. The term "inert" here means non-combustible. Such inert gases include nitrogen and argon. However, experiments showed that the use of nitrogen inflates the gas balance enormously and has a negative influence on the efficient separation of propellant gas residues. In particular, the presence of large amounts of nitrogen requires very powerful and thus also very expensive condensing plants to achieve a sufficient separation. On the other hand, using inert gases to avoid an explosion in the plant is necessary.

Thus, the invention is based on the task of producing a method for processing packaging materials, containing polyurethane prepolymers for the foam production, but also for adhesives so that the valuable materials contained therein can be recovered without releasing content materials that damage health and environment and without stressing the processing cycle with large amounts of fed-in nitrogen. At the same time, the method is intended to meet the requirements for protection against the danger of explosion.

The invention solves this problem with a method as described in the beginning which is carried out essentially in an atmosphere of propellant gas and/or solvent vapors. Preferably, this is a method which includes the following parallel steps:

Feeding the packaging materials into a working container while, at the same time, shredding them and then extracting the residues with a solvent, transferring the residue-containing solution from the working container to a distillation container, concentrating the residue-containing solution in this distillation container by distilling out the solvent, condensing the distilled solvent, returning the solvent to the working container as well as removing the packaging residues from the working container and, following sufficient enrichment, recovery of these residues in concentrated form from the distillation container.

The term "protective gas" or "propellant gas" in the invention refers to gases used as propellants and foaming agent in traditional pressurized cans (aerosol cans), particularly those for producing polyurethane foam as propellant and foaming agent. In particular, this includes propane, butane, dimethylether, fluorocarbons, as well as fluoromethane and fluoroethane (approximately R 134a and R 152 a) as well as fluoridated chlorinated hydrocarbons, as far as these are still in use and licensed for use, $CO_2$, $N_2O$ etc. Nitrogen and argon are included only in that they are released from pressurized cans where they form a component of the propellant mixture contents. "Propellant gases" in the narrow sense that they are used in the invention refer to the propellant gases released from pressurized cans that are processed. It must be understood here that in the starting phase for the method, "propellant gases" from other sources must be used to make the plant inert. R 134a and R152a are particularly suited for this. The extraction solvent, which is present in the atmosphere based on its vapor pressure, also plays a more or less significant role in rendering the plant inert. Up to 50% of $CO_2$ can be added to this mixture to protect against the danger of explosion.

We have to point out here that the operational safety of the method depends on the fact that the process takes place in a closed system and above the explosion limit of all component materials that are combustible and explosive. Insofar, it does not rest on the complete replacement of oxygen by a non-combustible gas.

The packaging to be processed is preferably transferred via conduit into the working container. This can be done with a traditional conduit, which ensures that the container remains sealed against the environment.

If the packaging material has not been opened, it is useful to do this during the feed-in and preferably along with the shredding, e.g. in a shredder especially designed for this purpose. In the following, this is called shredding.

It is particularly advantageous to open or shred the packaging materials by spraying them with solvents. On the one hand, this prevents foaming and, on the other, possibly entered water is absorbed by the solvent and distributed before it causes uncontrolled reactions with the content materials. This is very important particularly with materials that are sensitive to moisture, especially moisture-based interlacing of polyurethane prepolymers.

The shredded packaging material is subsequently placed onto a conveyor in the work area, preferably a worm conveyor, which is suited for separating the solid materials from fluids and solvents. A magnetic conveyor system must be considered if these packaging materials are ferromagnetic. A combination of both conveying methods may also be useful, particularly if the packaging materials consist of tinplate with plastic components, which is often the case with aerosol cans.

Extraction of the residues from the opened and/or shredded packaging material takes place in the working container with a solvent that is specifically designed for the respective residue. In any case, suitable solvents are those used to produce the packaging content originally and/or those still contained in the packaging materials.

On the one hand, extraction may take place by dropping the opened and/or shredded packaging materials into a working container filled with solvent and leaving them there for a period before they are moved along. The parallel alternative is to spray the packaging materials during the shredding and/or the conveying process with fresh solvent and then washing them. It is useful to bring the packaging materials in all three stages in contact with the solvent, that is to spray them during the shredding and conveying as well as subjecting them to solvent in the working container, for example in a catch funnel for the worm conveyor.

Subsequent to removing them, the solid residues are then dried in any optional sequence, are brought out on the conveyor and then sorted and moved toward the recycling area.

The traditional esters, ketones, aliphatic and aromatic hydrocarbons and their derivatives are particularly well suited as solvents, especially those with a boiling point of about 200° C. If containers with polyurethane prepolymers are processed, then acetone and toluol are particularly well suited as solvents.

Large amounts of propellant gases are released during the processing of residue-containing spray, pressurized and aerosol cans. It is not desirable that these gases escape to the atmosphere. If these propellant gases are not needed as inert gases, they are collected and condensed with suitable means. Such a condensation on the one hand may take place through compression until the gas liquefies and on the other by condensing out under low temperatures. These measures are useful, particularly for propellant gases that can be liquefied such as low boiling point fluorocarbons or even combustible hydrocarbons such as propane or butane.

The invention method transfers the residue-containing solution in the working container to a distillation container with, for example, a pump. In the distillation container, the solution is further condensed. To do this, the solution is heated up and the solvent distilled out of the liquid phase. It may be useful to work with reduced pressure to reduce the boiling temperature and avoid displacements in the residues. The distilled out solvents are condensed and, following this cleaning through distillation, are returned to the processing cycle if necessary. The residues in the distillation container liquid are drawn off after they are sufficiently condensed and removed for further processing.

In case the method in this invention is used to process aerosol cans with polyurethane prepolymers, it is useful to add a known thinner to increase the flow capacity of the prepolymers that collect in the distillation container. Such a thinner should have a higher boiling point than the respectively used solvent. Particularly suited for this is triethylphosphate or fresh raw material such as the raw materials used originally to fill the packaging materials.

The invention method is carried out with protective gas. Protective gases are the previously listed "propellant gases" and $CO_2$, $CO_2$-containing combustion gases and others like it, whereby the displacement of oxygen in the processing range is particularly important to avoid an explosive mixture. If a stored propellant gas admixture such as $CO_2$, R 134a and R 152a is used, it is useful to circulate it, whereby at suitable stages, propellants that are released from pressurized cans and evaporated solvents are separated out.

One special advantage of the inventive method that it can be run continuously and, with slight modifications, can be adapted to a multitude of pressurized can/aerosol cans now on the market.

Thus, the inventive method makes is possible, for example, to process residue-containing polyurethane prepolymers from aerosol cans and other containers and recover these so that they can be reused while, at the same time, recovering the raw material for the containers in a relatively clean form so that they can be recycled or sent to a waste dump. The prepolymer, which is enriched and concentrated during the process in the distillation container can be used for many purposes. For instance, it can be used as adhesive, dissolved in toluol or another solvent, or as a bonding agent for composite materials or as coupling agent for the production of molded parts made from recycled products such a vinyl tiles made of granulated old tires.

In the course of this method, the residues from aerosol cans or containers are moved to the working container and submerged in the solvent therein. As a result of the feeding in of residues into the working container and return of distilled solvent, the volume inside the container rises above the operating volume during which solvent is moved from the working container to the distillation container. On the whole, there is a constant volume of solvents and dissolved residues in the working container.

With a suitable medium, the distillation container is heated until the solution inside is boiling and a continuous solvent is distilled out. This solvent is then condensed with a cooling agent and returned directly or indirectly to the working container so that this container always has fresh solvent for dissolving the residues that are conveyed in. In this way, the residues that enter the working container are extracted continuously with solvent. The extracts become concentrated in the distillation container because the solvent there is removed continuously and will be recovered from there once they are concentrated enough. Insoluble residues that remain in the working container are drawn off from there at certain intervals.

The use of the inventive method is particularly advantageous for the recovery of prepolymers from aerosol cans for the production of polyurethane foam. The aerosol can empties via an adapter into the working container. However, it is more advantageous to open the cans and extract the contents in the working container. It is preferable to shred the aerosol can inside the working container in a specially equipped device, such as a shredder. The shredding residues can be removed from the working container with a magnet because aerosol cans usually consist of tinplate, or with a worm conveyor, as mentioned above.

Ester, ketone, apliphatic or aromatic hydrocarbons or their derivatives with a boiling point of about 200° C. are particularly suited as solvent for the extraction. Alkyl ester of monocarboxylic acids and ketones with up to 8 carbon atoms, as well as alkyl benzene with up to 10 carbon atoms are especially suitable. Acetone, ketone, toluol and xylene are preferred. If the extracted prepolymer subsequently is to be used for adhesives, it is advisable to use toluol because adhesives based on polyurethane are frequently used in toluol solution. In addition, solvents of polyurethane prepolymers in toluol have a comparably low viscosity.

A thinner may be added to the distillation container which ensures or improves the flowability of the transferred and concentrated prepolymer. If the thinner is added at the start of the extraction already, it must have a higher boiling point than the solvent so that it does not become depleted during the extraction. Generally used thinners for prepolymers are trialkylphosphate, particularly triethylphosphate, or other raw materials that correspond to the original material.

With the inventive method, the propellant still contained in the aerosol cans—as a rule fluoridated chlorhydrocarbons, partially halogenated hydrocarbons, dimethylether, propane, butane, etc.—is collected and recovered if it is not used to render the plant inert. For this purpose, the gas flow coming from the working container can be condensed so that the propellants in it are liquefied. As an alternative, the propellants can be condensed by cooling them and collected in a cooling trap.

The inventive method is suited for batch quantities as well as for a continuous process. However, a continuous operation is recommended because of the still high investment costs.

Furthermore, the invention concerns a plant for use with the inventive method. Such a plant includes an incoming conduit, a device for opening the fed-in packaging materials, a collection container for the opened materials, at least one each feed-line for fresh solvent and protective gas, one discharge for solvent containing soluble packaging residues, one conveyor for solid packaging residues as well as at least one solvent spraying nozzle that is directed toward the device for opening the packaging materials. Peripheral equipment for recovering the solid and dissolved packaging residues, recovering the solvent as well as a trap for propellant gases released from the packaging materials are also connected.

The device for opening the fed-in packaging materials, which is used in the plant, consists of a traditional shredder with two counter-rotating drums equipped with cutting blades. It is essential that such a shredder or any other device for opening the packaging materials is sprayed with solvent during the process of opening so that all released residues are absorbed directly in by the solvent. This avoids a foaming up of the contents if it contains propellants, but also the sticking together. At the same time, any water adhering to or which has entered the packaging material is distributed by the spraying so that an uncontrolled reaction between the water and any released packaging content is avoided. This is particularly important during the processing of packaging materials containing polyurethane prepolymer, which interlaces uncontrollably if there is water present and can gum up the opening device. In the presence of sufficient amounts of solvent, the concentration of water that has entered can be reduced to a level where an uncontrolled reaction is impossible. Any interlacing that might still occur will stay in the tolerable range.

It is useful to have at least one spraying nozzle above the shredder. It is particularly advantageous if during the process of opening the containers, the opener is sprayed with solvent from top and bottom with at least one spray nozzle. Following the shredding, the packaging materials, together with the sprayed-on solvent, are transferred to a collection and extraction container from which the dissolved and/or liquid components are discharged via a line and the solid residues are removed by conveyor.

It is useful if the conveyor is a worm conveyor which projects into the lower part of the collection container filled with solvent and removes the solid components from there. This worm conveyor is preferably sprayed with fresh solvent from one or more spray nozzles to wash off any packaging residue solution still clinging to the solid packaging residue that is removed. The washed conveyor materials is then moved through a drying plant and removed via an outgoing conduit from the plant. Subsequently it is moved to another place for further sorting and reuse.

The solvent used in the inventive method is effectively recirculated. This requires a continuous removal of the solvent from the extraction and collection container, distilling out of the dissolved content materials and, following condensation, feeding the solvent back into the plant via a pipe system and the spray nozzles or, if necessary, the washing device.

In accordance with the inventive method, the plant is run with protective gas, as described above. If the protective gas is not released from the packaging materials themselves, it is piped in near the opening device and is drawn off again from the extraction and working container and/or the drying plant. In order to avoid additional costs, the protective gas can be recirculated. It is useful in that case to equip the protective gas circulation with a device to separate out aerosols, moisture, propellant gases that were carried along and absorbed solvents.

It is useful to load the conduits with inert gases via separate lines. This is the only time it makes sense to use nitrogen, argon or $CO_2$ to prevent unwanted gases from escaping to the environment.

BRIEF DESCRIPTION OF THE DRAWINGS

The invention is explained in more detail in the enclosed drawings (preferred form), which show as follows:

FIG. 1 shows a laboratory-scale recycling plant for a polyurethane foaming agent. Inside a three-necked flask 1 with feed-in 2 and an overflow 4, as well as a vertical tube which ends in a reflux condenser 3, is the extraction solvent, to which the contents of not completely empty aerosol cans for the PU foam production is added via a feed-in 2 and an adapter that is not shown. A hollow magnet 10, which is moved with a magnetic stirrer 9, ensures continuous mixing.

Figure 1:
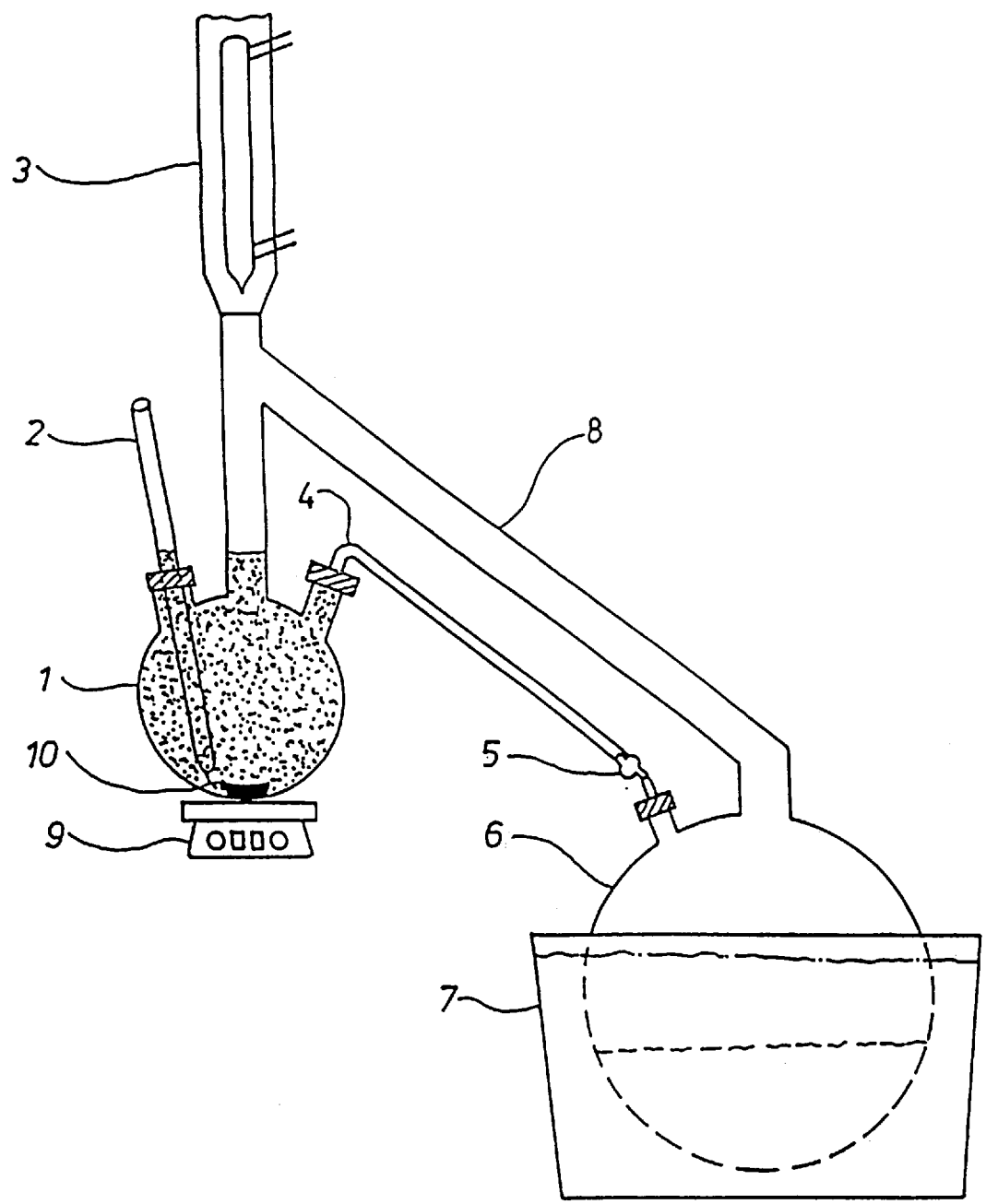
FIG. 1 A laboratory-type recycling plant for illustration.

The solution from flask 10 is transferred to liquid flask 6 via overflow 4 in the same amounts at which material is added via feed-in 2 to the three-necked flask. A shut-off valve 5 ensures that there is a continuous supply of solution. The liquid flask 6 is heated with a heated bath 7 until the solution inside is boiling and evaporated solvent is distilled out via a tube 8 which connects to the reflux cooler 3. The solvent without extract that condenses at reflux cooler 3 drips back into operating flask 1, where it again participates in the extraction and, at the same time, effects a transfer of solution to the liquid flask 6.

The working of the inventive method in the above-described apparatus starts with the preparation of operating flask 1 which is filled, for example, with acetone as solvent. Parallel to that, a small amount of thinner such a triethylphosphate is filled into liquid flask 6 along with another solvent so that the collecting prepolymer in it remains free-flowing.

Subsequently, the cycle is started. The liquid flask 6 is heated to about 90° C. and the reflux cooler and magnetic stirrer are activated. After about 15 min., a system cycle has balanced out, meaning as much solvent as evaporates from liquid flask 6 via the distillation bridge 8 into reflux cooler 3, condenses there and drips into operating flask 1. From there, the solvent circulates via overflow 4 and shut-off valve 5 back to liquid flask 6. The cycle is closed.

As soon as a balance has been established, PU foam is fed into operating flask 1 via the feed-in tube 2 and an adapter which is not depicted. There, the foam dissolves immediately, the prepolymer dissolves and the propellant escapes through cooler 3 and is deposited in a cooling trap (not shown) at its upper end. The fed-in prepolymer volume flows as a thinned solution via the overflow 4 into liquid flask 6. There, the prepolymer is enriched to the same degree that PU foam is sprayed via feed-in tube 2 into the operating flask 1 and is then transferred to the liquid flask as a thinned solution. The free-flowing solvent, on the other hand, is in the cycle and is returned again and again from the liquid flask to the operating flask.

At the end of the operating cycle, a prepolymer solvent mixture rich in prepolymer forms in liquid flask 6. Closing the shut-off valve will prevent new solution from flowing into the liquid flask so that the prepolymer can be condensed further through distillation. The prepolymer is drawn from the liquid flask once it has reached the desired concentration and/or enrichment.

It is natural that not only the prepolymer component from the aerosol cans will be enriched in the liquid flask, but also the inherent additives and catalysts. As far as the product is again used to form polyurethane, these substances do not cause any problems. If it is used for other purposes, these substances can be removed at least partially through distillation under normal pressure or in a vacuum through extraction with solvents, which do not dissolve the polymer and do not react with it.

Figure 2:
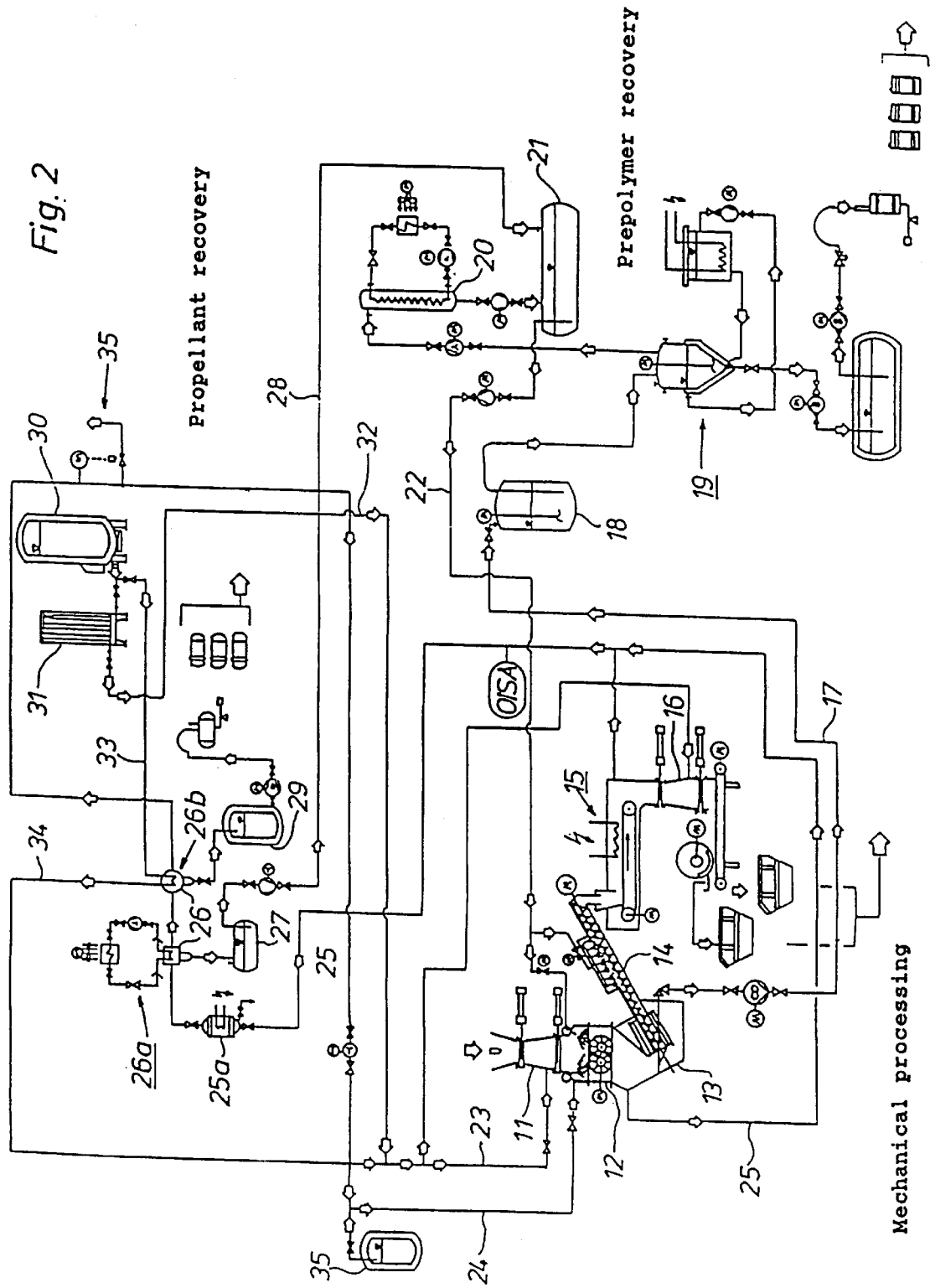
FIG. 2 A technical plant according to the invention.

FIG. 2 shows a diagram of the processing sequence inside a plant for prepolymer recovery from packaging containing prepolymers, particularly aerosol cans, which is operated according to the inventive method. This method can be used to process other packaging materials as well, without modifications as would be apparent to the expert.

The plant as shown in FIG. 2 consists of three stages, the mechanical processing, the prepolymer recovery and the propellant recovery. In the mechanical processing stage, the delivered packaging materials first pass through an initial storage area and then reach a charging station where the packaging is freed of foreign materials and plastic components and is also pre-dried. They are then fed into a shredder 12 via a metered addition with a scale and an input conduit 11. In the shredder, they are shredded while being sprayed with solvent and transferred to working container 13. In this working container, the shredded packaging materials are washed with solvent and separated from any soluble components. The solid components are removed via a conveyor 14 while being sprayed continuously with solvent and are then fed into a drying plant 15 and subsequently removed from the operating cycle via a conduit 16. The solvent evaporated in the drying plant 15 is condensed and returned to the process. After being removed, the shredded solid materials are sorted according to material type and moved to a recycling facility.

The solvent collected in working container 13 and all residues dissolved therein is conducted through line 17 to a receiving container 18 from which the solution is then piped to the distillation plant. There, the solution is distilled out, if necessary under low pressure. The distillation residue is then drawn off, adjusted and conditioned for further use and returned to the economic cycle. Residues which cannot be reused can either be burned or deposited as concentrate on a disposal site.

The solvent distilled out of distillation plant 19 is condensed in a condensation plant 20 and returned to the cycle via a storage tank 21 and line 22. Solvent losses are balanced by fresh solvent. The condensed solvent travels from storage tank 21 via spray nozzles (see FIG. 3) to shredder 12 and conveyor 14 back into working container 13.

Like the extraction and distillation, the shredding inside shredder 12 is done in the presence of protective gas, piped in via line 24. Normally, the accumulating propellant gases are sufficient to cover the protective gas need during the plant operation. A feed-in via line 24 is needed, in particular, if mostly empty pressurized cans are processed or when the plant is first started. The gas component released during shredding is led together with the protective gas flow via line 25 and, if applicable, an aerosol separation plant and drying plant 25a to a condensation facility 26. There, in a first stage 26a, adhering solvent is separated out and fed into a storage container 27 which is connected via line 28 with the solvent tank 21 for condensing plant 20. In a second stage 26b, the propellants are condensed, recovered and collected in a tank 29 if they are not used as protective gas for the plant. Propellant gases which are collecting in distillation plant 19 can also be fed into the propellant condensing plant. A portion of the propellant gases is returned from the condensing plant to the processing plant and, if necessary, replenished from storage tank 35 via line 24. Conduits 11 and 16 each are supplied via lines 32 and 34 with nitrogen from liquid gas tank 30, which arrives either after passing through a distiller 31 or heat exchanger 26b.

It is useful to condense the propellants from line 25 in condenser 26b with the aid of fresh and cold liquid nitrogen supplied via line 33 from liquid gas tank 30. This nitrogen is subsequently fed into conduits 11 and 16 via lines 34 and 23. Propellant gas components which are not condensed and do not cause damage are released into the atmosphere near tank 35, following condensation, if the protective gas need of the plant is met.

Figure 3:
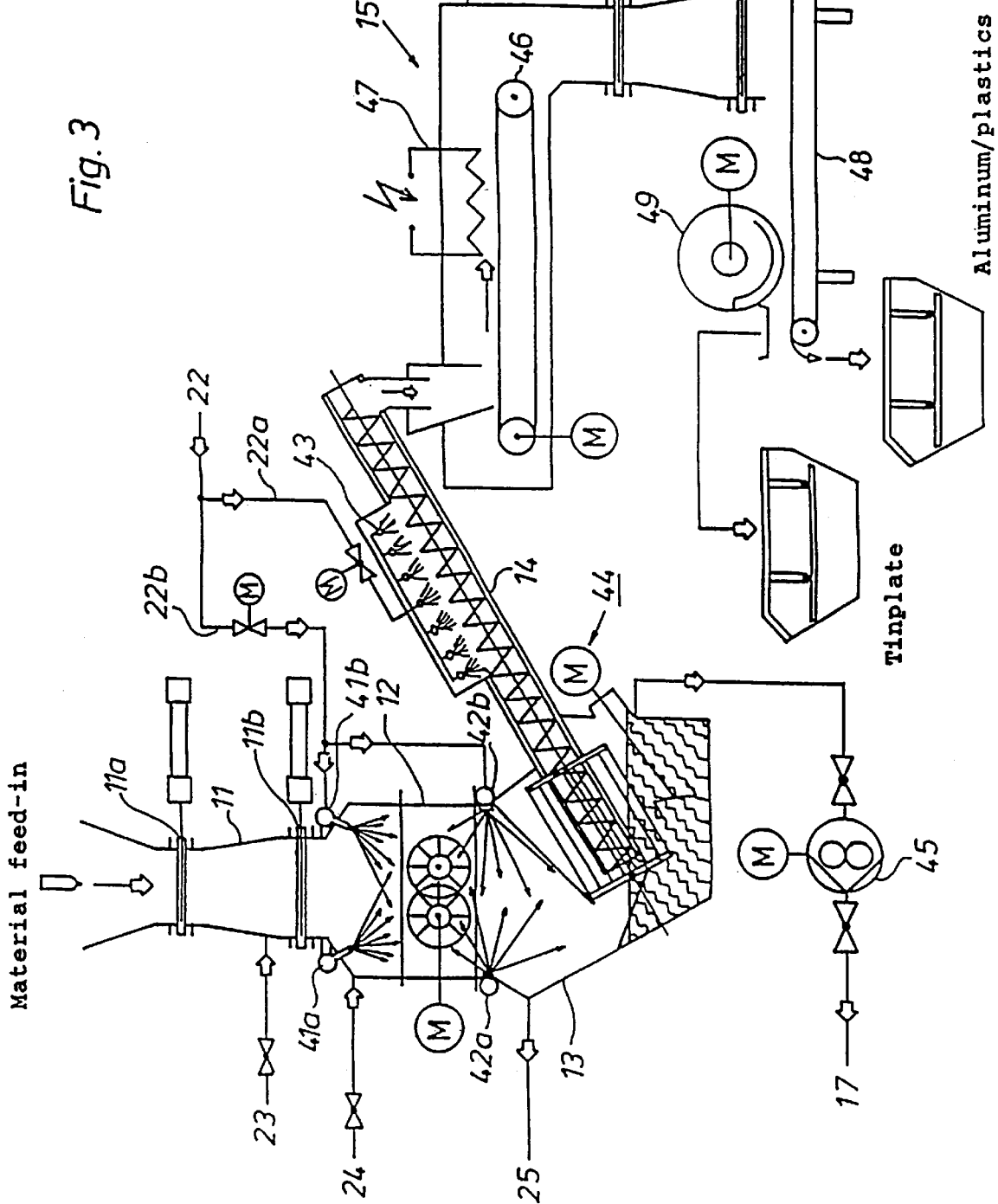
FIG. 3 A detailed representation of the plant in FIG. 1.

FIG. 3 shows an inventive plant for mechanical processing of residue-containing packaging materials. This plant consists of a material feed and a conduit 11, which is filled with packaging materials ready for processing via a traveller 11a and which releases the fed-in packaging materials via a second traveller 11b to the actual plant. Conduit 11 is filled with nitrogen via line 23.

Below conduit 11 is an opening and/or shredding device consisting of two motor-driven (M) and counter-rotating drums, which shred the fed-in packaging materials with their attached cutting blades or similar cutters. Two spray nozzles 41a and 41b for spraying solvent onto the surface of the rotating drum are arranged above the shredder. Solvent is sprayed onto the shredded materials in the same way with spray nozzles installed at an angle below the shredder drums.

Spray nozzles 41*a,* 41*b* as well as 42*a* and 42*b* are supplied with fresh solvent via feed-in lines 22 and 22*b,* which is transported after spraying, together with the shredded materials to the extraction and working container 13 below the shredder 12. Container 13 holds the extraction/solvent mixture together with the solid components of the packaging materials. A motorized stirrer 44 ensures that solid residues and solvent are in close contact and the extraction is effective. The extract is pumped from container 13 with a motorized pump 45, through a line 17 and into storage container 18 for prepolymer recovery, which is shown in FIG. 2.

A worm conveyor 14, the lower end of which is submerged in the extract/solvent mixture, removes solid packaging residues from container 13. To remove extract from the solid packaging material residues, these are moved with the worm conveyor through a washing segment which contains spraying nozzles 43 that are pointed toward the conveyor. Spraying nozzles 43 are supplied with fresh solvent via lines 22 and 22*a*. The solvent sprayed onto worm conveyor 14 travels to container 13.

The solid packaging residues moved along with worm conveyor 14 are fed via a batch funnel into a drying facility 15 where a conveyor 46 moves the solid residues along under a heater 47. From there, the materials are moved to a discharge conduit 16. This conduit 16 is sealed on the plant side with a slide 16*a* and on the solid material processing side with a slide 16*b*. Nitrogen can be fed into conduit 16 via a line 23*a*.

The processing plant consists of a motorized conveyor 48 which transports the material through a magnetic separator 49. With the aid of this magnetic separator, the material is separated according to its magnetic qualities.

The invention-based plant according to FIG. 3—with the exception of the conduits—is operated with protective gas. This protective gas is fed via line 24 into shredder 12 and distributed throughout the plant. Any protective gas leaving the plant, which contains solvents and small amounts of nitrogen from the conduits, is drawn off via line 25 from container 13 and/or via line 25*a* from the drying facility 15 for solid packaging residues. It may be useful to recirculate the protective gas if the amount of gas collecting from the pressurized cans is low.

It is useful to have motorized valves in all lines if it is necessary to regulate the flow of material in them.

This is particularly true for the solvent feed-in lines to the spray nozzles and washing facilities, the operation of which can be stopped as soon as the material feeding and/or removal of solid residues is finished.

In the preceding description, the terms propellant, propellant gas, protective gas and inert gas are used interchangeably, insofar as the operation of the actual plant is concerned. With respect to the conduit arrangement, the protective and/or inert gases are understood to be traditional protective gases such as nitrogen and argon.

The facilities and plants used for the inventive method are commercially available or can be retrofitted by an expert to suit this purpose through simple modification or adaptation of known facilities and plants.

We claim:

1. Method for processing pressurized aerosol cans containing polyurethane prepolymer residues, while recovering aerosol can materials and said polyurethane prepolymer residues, said method comprising the steps of:

placing pressurized aerosol cans containing polyurethane prepolymer residues into a working container while, at the same time, opening the aerosol cans and extracting at least the prepolymer residues with a solvent, wherein a residue-containing solution and residue aerosol can materials are formed;

transferring the residue-containing solution from the working container to a distillation container;

concentrating the residue-containing solution in the distillation container by evaporating the solvent therefrom, thereby leaving at least the prepolymer residues;

condensing the evaporated solvent and returning the solvent to the working container;

removing the aerosol can materials from the working container to recover said aerosol can materials;

recovering at least the prepolymer residues in concentrated form from the distillation container; and providing a protective atmosphere in at least said working and distillation containers, wherein at least said steps of placing the pressurized aerosol cans into a working container, opening the aerosol cans, extracting at least the prepolymer residues with a solvent, transferring the residue-containing solution to a distillation container, concentrating the residue-containing solution in the distillation container, condensing the evaporated solvent and removing the aerosol can materials from the working container are conducted in a protective atmosphere consisting of solvent vapors and propellant gas.

2. Method according to claim 1, wherein said containers are shredded to open them up.

3. Method according to claim 2, wherein said containers are shredded while being sprayed with a solvent.

4. Method in accordance with claim 3, wherein the aerosol can materials from said shredding are removed from the working container with a worm conveyor.

5. Method according to claim 2, wherein the residue aerosol can materials are removed magnetically from the working container.

6. Method according to claim 2, wherein the residue aerosol can materials are sprayed with solvent while being removed.

7. Method according to claim 1, wherein said solvents used are ester, ketone, aliphatic and/or aromatic hydrocarbons with a boiling point of up to 200° C.

8. Method according to claim 7, wherein acetone or toluol are used as solvents.

9. Method according to claim 1, wherein said solvent is evaporated from the distillation container under low pressure.

10. Method according to claim 1, wherein at least propellant gases contained in the aerosol cans are separated out and recovered.

11. Method according to claim 10, wherein said gases are condensed.

12. Method according to claim 1, wherein at least said steps of placing the pressurized aerosol cans into a working container, opening the aerosol cans, extracting at least the prepolymer residues with a solvent, transferring the residue-containing solution to a distillation container, concentrating the residue-containing solution in the distillation container, condensing the evaporated solvent and removing the aerosol can materials from the working container are further conducted in an atmosphere of solvent vapors and a released propellant as protective gasses.

13. Processing plant for processing pressurized aerosol cans containing polyurethane prepolymer residues, while recovering aerosol can materials and said polyurethane prepolymer residues, said plant comprising:

at least one input conduit;

at least one output conduit;

means for opening up pressurized aerosol cans containing polyurethane prepolymer residues fed in from the input conduit;

a collection container for containing said opened pressurized aerosol cans during processing;

at least one feed line for providing protective gas including at least fresh solvents to at least said pressurized aerosol can opening means to form a protective atmosphere consisting essentially of solvent vapors and propellant;

discharge means for removing solvents containing soluble container residues from the collection container;

conveyor means for removing solid container residues from the collection container;

at least one spraying means pointed toward the pressurized aerosol can opening means, for spraying solvents from said feed line;

an evaporation container connected to the discharge means for receiving and distilling out the solvents from the soluble aerosol can residues;

condensation means for recovering evaporated solvents from the evaporation container; and means for recovering the soluble aerosol can residues from the evaporation container.

14. Processing plant according to claim 13, wherein the means for opening up the pressurized aerosol cans includes a shredder with two counter-rotating round cutters.

15. Processing plant according to claim 13 wherein the spraying means includes at least one spray nozzle installed above the means for opening up the pressurized aerosol containers and pointed towards the opening means.

16. Processing plant according to claim 13, wherein the spraying means includes at least one spray nozzle installed below the means for opening up the pressurized aerosol cans and pointed towards the opening means.

17. Processing plant according to claim 13 wherein the conveyor means includes a conveyor worm which projects into the collection container for removing the solid aerosol can residues therefrom.

18. Processing plant according to claim 13 further comprising nozzles for spraying solvent installed above the conveyor means for removing the solid aerosol can residues and pointed towards the conveyor means.

19. Processing plant according to claim 13 wherein a drying rack follows said conveyor means.

20. Processing plant according to claim 13 further comprising: separate protective gas lines provided with the input conduit for providing protective gasses.

21. A method according to claim 13, wherein said protective gasses are selected from the group consisting of propane, butane, dimethylether, fluoridated hydrocarbons and $CO_2$.

* * * * *